United States Patent [19]

Crolla

[11] Patent Number: 5,361,682
[45] Date of Patent: Nov. 8, 1994

[54] APPARATUS FOR RAPIDLY COOKING ALIMENTARY PASTAS

[76] Inventor: Francesco Crolla, Via Pisve, 38, 21018 Sesto Calende VA, Italy

[21] Appl. No.: 930,681
[22] PCT Filed: Mar. 26, 1991
[86] PCT No.: PCT/EP91/00573
 § 371 Date: Nov. 20, 1992
 § 102(e) Date: Nov. 20, 1992
[87] PCT Pub. No.: WO91/14391
 PCT Pub. Date: Sep. 3, 1992

[30] Foreign Application Priority Data

Feb. 13, 1991 [IT] Italy .......................... MI 91A000369

[51] Int. Cl.$^5$ ............................................ A47J 27/00
[52] U.S. Cl. ........................................ 99/352; 99/330; 99/355; 99/407; 426/509; 426/523
[58] Field of Search ............... 426/233, 509, 523, 557; 99/330, 352, 355, 403, 407

[56] References Cited

U.S. PATENT DOCUMENTS

| | | | |
|---|---|---|---|
| 3,827,344 | 8/1974 | Pratolongo | 99/352 |
| 3,937,135 | 2/1976 | Pratolongo | 99/352 |
| 4,718,331 | 1/1988 | Ansaloni | 99/352 |
| 4,803,916 | 2/1989 | Tacconi | 99/330 |
| 4,821,632 | 4/1989 | Bolzani et al. | 426/509 |
| 4,954,359 | 9/1990 | Pratolongo | 426/509 |
| 5,142,966 | 9/1992 | Morandi et al. | 99/330 |
| 5,172,627 | 12/1992 | Narcisi | 99/352 |

FOREIGN PATENT DOCUMENTS

| | | |
|---|---|---|
| 0140987 | 5/1985 | European Pat. Off. . |
| 0296549 | 12/1988 | European Pat. Off. . |
| 1221703 | 11/1987 | Italy . |
| WO8700741 | 2/1987 | WIPO . |
| WO8704910 | 8/1987 | WIPO . |
| WO9005474 | 5/1990 | WIPO . |

Primary Examiner—George Yeung
Attorney, Agent, or Firm—Cushman, Darby & Cushman

[57] ABSTRACT

Process for fast cooking filamentary alimentary pastas and the like, consisting in feeding high-temperature, pressurized water to a pre-cooking chamber thermostatted by means of the same high-temperature water, feeding to the chamber, and by means of a metering feeder, a portion of raw pasta together with hot water, and keeping the pasta under such condition until the pasta is softened, feeding a further amount of hot water to the pre-cooking chamber in order to stir the softened pasta, transferring the pasta to a thermostatted end-cooking chamber, and removing hot cooking water causing the hot water to circulate through a plurality of expansion chambers before being sent to a heat exchanger associated with the water feed pipe. Fast-cooking apparatus suitable for practicing the process in an automatic way, in which the operating cycle is governed by a microprocessor, or the like.

15 Claims, 2 Drawing Sheets

APPARATUS FOR RAPIDLY COOKING ALIMENTARY PASTAS

FIELD OF THE INVENTION

The present invention relates to a process for rapidly cooking, under an increased pressure, alimentary "pastas", such as noodles and similar filamentary "pastas", which process is capable of allowing pre-established doses of cooked "pasta" to be automatically produced, at time intervals which may even be shorter than 1 minute.

The present invention relates also to an automatically operating apparatus to practice said process.

BACKGROUND OF THE INVENTION

Several processes and relevant automatic apparatuses for rapidly cooking, under an increased pressure, doses of alimentary "pasta", in particular noodles and the like, which processes are capable of enabling doses of "pasta" cooked and ready-to-eat to be distributed at short time intervals, are already known.

In general, the processes known from the prior art to rapidly cook these alimentary "pastas" substantially envision an initial pre-cooking in water for a time of 40–50 seconds inside a vertical-axis chamber under high pressure and at a high temperature and, soon after, an end cooking also for a few seconds time, at a lower temperature, in order to enable "pasta" to absorb the correct water amount.

At the end of the cooking step, the dose of "pasta" is separated from cooking water, and is transferred to trays or dishes to be eaten Some of these processes end apparatuses for rapidly cooking alimentary "pastas" under an increased pressure are reported, e.g., in the following issued patents/published patent applications.

Namely, published International patent application WO 87/04910 relates to the fast cooking of filamentary alimentary "pastas", which is attained by carrying out the pre-cooking step of a metered amount of "pasta" inside a chamber installed inside a kettle, at a high-temperature (i.e., at 130° C.–150° C.) and under a pressure comprised within the range of from 4 to 6 bars. Water enters the pre-cooling chamber from the bottom thereof and after a 40 seconds time "pasta" becomes soft; said softened "pasta" is then sent to an end-cooking chamber and after about 40 seconds is discharged onto a tray, ready-to-eat. The apparatus adopts various contrivances to improve the operating conditions, to recover the heat contained in the waste water, and a feeder for raw "pasta" of carrousel or dial type, with a plurality of compartments each containing a dose of "pasta" to be cooked.

U.S. Pat. Nos. 3,937,135 and 3,877,344 relate to a same fast-cooking process, and differ from each other only because according to the second patent, a centrifugal separator is used to remove the excess of cooking water, whilst tile first one uses, for that purpose, a separator of a different type. Both said patents accomplish the cooking step inside a pressurized chamber, which is separated from the heated-water kettle, and is kept at a temperature higher than 100° C.; pre-cooked "pasta" is transferred by the same water pressure to an end-cooking chamber from which excess water is removed from cooked "pasta" by means of a separator.

According to Italian patent application No. 65,711 A/83, a kettle is used which is at a temperature comprised within the range of from 120° C. to 180° C., and is equipped with a cooking chamber partially of cone-frustum shape fop the direct cooking of "pasta", with cooked "pasta" being discharged from the bottom; whereas Italian patent application No. 66,710 A/83 provides a pre-cooking chamber installed inside the interior of the kettle and a separate end-cooking chamber provided with a stirring fork to stir "pasta" during the end-cooking step; pre-cooked "pasta" is pushed into the interior of the end-cooking chamber by the same water pressure existing inside the pre-cooking chamber.

Furthermore, in Italian patent application No. 9470 A/85, the pre-cooking chamber is placed inside the kettle and the end-cooking chamber is connected with a heat exchanger to recover heat contained in cooking water.

Finally, also Italian patent No. 1,221,703 provides a pre-cooking chamber inside the interior of the kettle, and a conditioning chamber i.e., a chamber inside which the end-cooking of "pasta" takes place.

All these, as well as other apparatuses known from the prior art to rapidly cook alimentary "pastas" only partially solved the several problems one should solve in the practice in order to enable an automatic cycle for fast cooking alimentary "pastas" in particular noodles to be correctly exploited at a commercial level, simultaneously securing a rigorous constancy of the quality of the obtained product, also after a large number of operating cycles.

In fact, the total time required by such a type of cooking cycle should preferably be shorter than 1 minute; the pressurized chambers and kettles for hot water must have a capacity lower than 5 liters due to homologation reasons; the absorbed powers should be of not more than 4.5 kW in order to have energy costs compatible with the market of automatic dispensers, "pasta" should be cooked in a uniform way, and should remain uniform until it is actually dispensed; and furthermore the cooking apparatus must be reliable, i.e., it should not show drawbacks also after long operating times, and furthermore should not undergo jammings or stoppages during the step of loading of raw "pastas".

SUMMARY OF THE INVENTION therefore, a purpose of the instant invention is of providing a process for fast cooking alimentary "pastas" under increased pressure, and a suitable apparatus for practicing said process, which are so conceived as to meet all of the requisites and requirements posed by an automatic cycle for cooking filamentary alimentary "pastas", useable as an automatic dispenser of doses of cooked "pastas", variable as desired.

Another purpose of the invention is of providing a fast cooking apparatus, which is so constructed as to result compact and reliable, requires a low energy consumption, can be used both continuously and at time intervals, and is equipped with means capable of securing a regular operation thereof, without it undergoing jammings and hence such as to require an extremely reduced servicing.

These and still further purposes, which are better evidenced in the following, are achieved by a process for fast cooking, under increased pressure, doses of filamentary alimentary "pastas" and the like, in particular noodles and the like, of the type envisaging an initial step of pre-cooking raw "pasta" under an increased pressure, with high-temperature water, a step of end cooking at a lower temperature, a step of metering of the "pasta" to be fed to the process, and means for separating cooking water from cooked "pasta", which process comprises according to the present invention, the following steps:

constantly maintaining, inside a kettle or the like, water under an increased pressure and at a high temperature, suitable for being fed to said pre-cooking chamber and possibly to said end-cooking chamber in order to stabilize the temperature thereof;

uniformly and constantly pre-heating said pre-cooking chamber by water under an increased pressure and at a high temperature, withdrawn from said kettle;

feeding a metered amount of raw "pasta", previously prepared inside an automatic metering unit, into said pre-cooking chamber together with water withdrawn from said kettle in order to lubricate said dose of raw "pasta";

perform the under-increased-pressure-pre-cooking step for a pre-established time, comprised within the range of from 15 to 20 seconds, by means of water withdrawn from said kettle, so as to obtain a soft enough "pasta";

send a further amount of pressurized water, withdrawing from said kettle, into said pre-cooking chamber, in such a way as to cause "pasta" to be stirred;

causing pre-cooked "pasta" to be transferred into said end-cooking chamber, kept thermostatted, by effect of the pressure drop existing between said chambers, combined with the thrust applied by the stirring water jet;

maintaining said pre-cooked "pasta" inside said end-cooking chamber for a time comprised within the range of from 15 to 20 seconds, at a constant, controlled temperature; and, after the end cooking removing the steam generated by the hot cooking water causing said water to circulate through a cascade of expansion chambers in order to cause a decrease in its pressure to take place before said water reaches a heat exchanger associated with the kettle feed pipe, with also said cooking water being sent to said heat exchanger.

More particularly, during the end-cooking step, the necessary amounts of salt and/or oil are added. Furthermore, said end-cooking chamber is thermostatted by exploiting the exceeds of pressure which occurs during the step of pre-heating and thermostatting of the pre-cooking chamber.

An apparatus for fast cooking, under increased pressure, filamentary alimentary "pastas", suitable for practicing said process comprises, according to the present invention:

a kettle boiler, equipped with heating means, fed by the water distribution network through a heat exchanger, and destined to produce high-temperature pressurized water;

a vertical-axis pre-cooking chamber thermostatted by means of hot water fed from said kettle and connected, at its upper end, with a hopper fop feeding raw "pasta" through a mobile-compartment metering unit and, at its bottom, with an end-cooking chamber;

means for hydraulically connecting said kettle with the base of said pre-cooking chamber and with the top of said chamber, so as to enable water to be sent from said kettle to both opposite ends or said pre-cooking chamber;

an end-cooking chamber with an openable bottom, destined to receive the "pasta" pre-cooked in said pre-cooking chamber, and equipped with means for controlling the temperature both by respectively withdrawing hot and/or cold water from said pre-cooking chamber and from the external water-distribution system, and by controlled-expansion means to gradually reduce the pressure of steam formed inside said chamber during the transfer of said pre-cooked "pasta" into it;

a plurality of expansion chambers installed in cascade downstream said end-cooking chamber, suitable for gradually reducing the pressure of steam generated by the cooking water before feeding said water to said heat exchanger, to which also said cooking water is fed; and a microprocessor-based data processing unit or the like, suitably programmed in order to carry out the operating steps of the units which compose the apparatus.

The structural and functional characteristics of said apparatus will be clearer from the following disclosure in detail of a preferred, made by referring to the accompanying drawing tables, supplied for merely indicative purposes, in which:

DETAILED DESCRIPTION OF THE INVENTION

Figure 1:
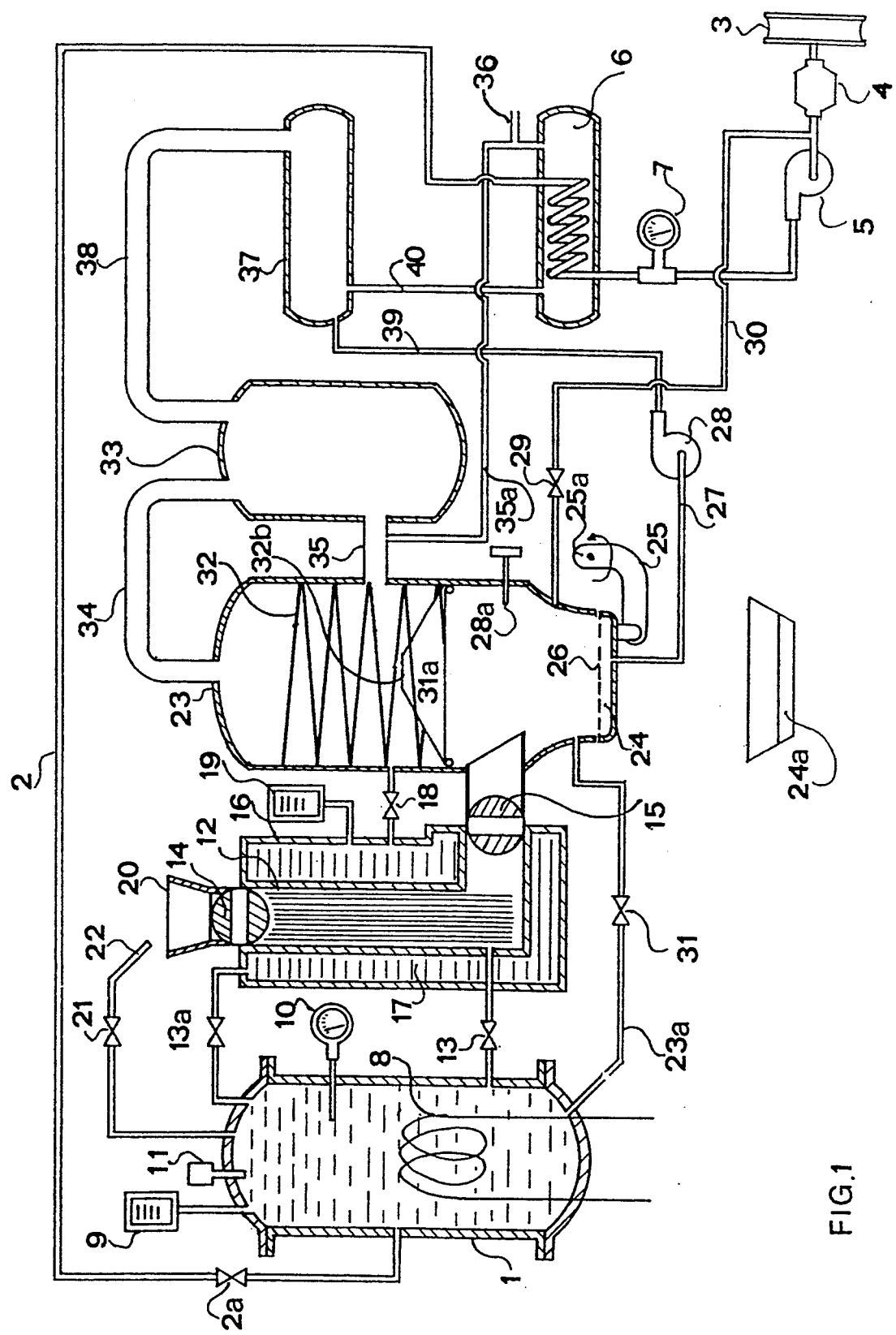
FIG. 1 shows a schematic assembly view of the apparatus according to the present invention.
Figure 2A:
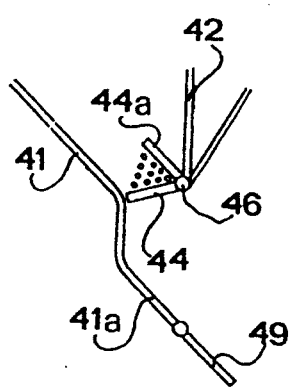
FIGS. 2 and 2a show a raw-"pasta" metering/feeding unit, constructed according to the instant finding and shown in its loading position, whilst
Figure 2:
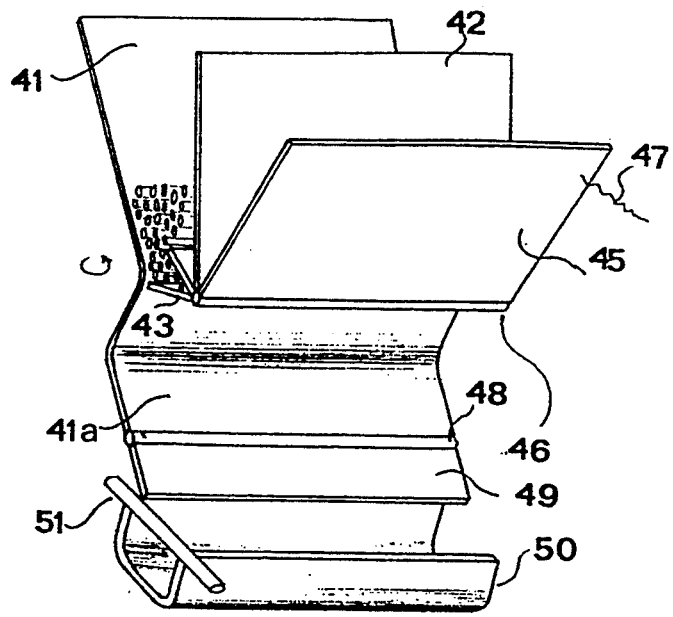
Figure 3A:
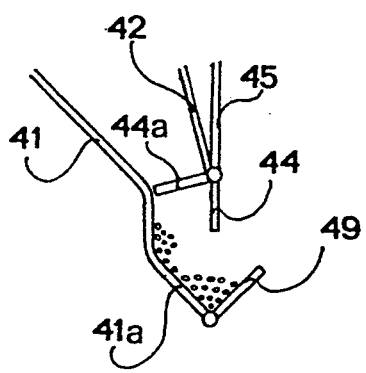
FIGS. 3 and 3a show the same metering/feeding unit in its discharging position.
Figure 3:
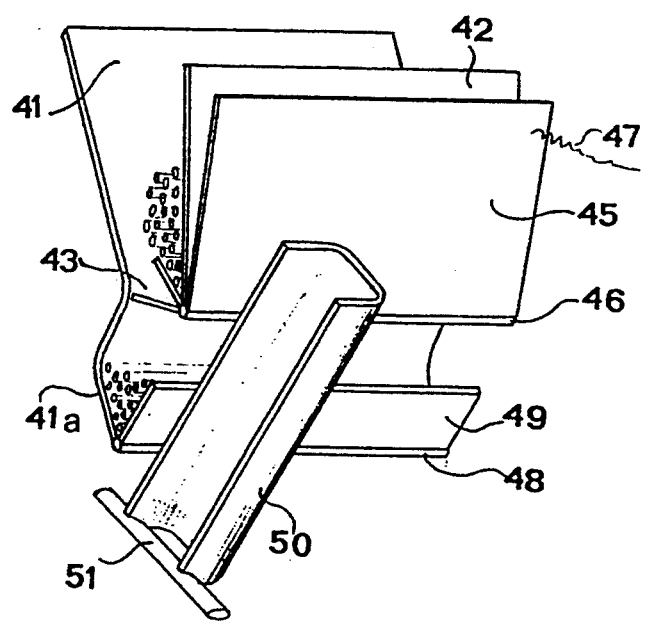

Referring in particular to FIG. 1, the apparatus for fast cooking filamentary alimentary "pastas" is constituted by a kettle or boiler 1 with a capacity of less than 5 liters, to which water is fed through a pipe 2 equipped with a non-return valve 2a; water is withdrawn from a suitable source such as, e.g., the normal water distribution system 3, through a filter/water softener 4, by means of a pump 5, and flows through a heat exchanger 6, the task of which is explained in detail in the following.

The flow rate of water is controlled by a flow meter 7 and water contained inside the kettle is heated by a metal-clad electrical resistor 8 up to a temperature of about 175° C. and a pressure of 8.5 bar. The pressure inside the kettle is regulated by a pressure switch 9, and a temperature measuring device 10 measures the temperature of water; the kettle is moreover equipped with a safety valve 11 which opens when the internal pressure reaches the value of 10 bar.

With the kettle a pre-cooking chamber 12 is associated, which has a shape, e.g., cylindrical, such as to contain the full length of the filamentary-shaped "pasta"; said chamber is put into communication with the kettle through a non-return valve 13; at both ends of said chamber 12 two ball valves 14 and 15 are respectively provided, wherein the first ball valve enables "pasta" to enter the pre-cooking chamber 12 and the second ball valve enables "pasta" which ended its pre-cooking step, to be transferred to the following step.

Said chamber 12 is surrounded by a jacket 16, e.g., a metal jacket, which defines an air space 17 destined to be filled with water, through a valve 13a, which puts said air space 17 into communication with the kettle 1, which filling water is at the same temperature and pressure as of water contained inside said kettle, thus allowing a perfect uniformity of temperature to be reached during the pre-cooking step. Said air space 17 is put into communication with the following cooking chamber through a non-return valve 18, regulated by a pressure switch 19 because of reasons which are better explained in the following. A funnel 20 with suitable size enables raw "pasta" to be perfectly charged to the pre-cooking chamber 12, and a solenoid valve 21 makes it possible water to be withdrawn from the kettle 1 and to be sent to an ejector 22 hanging over the valve 14, due to reasons which also are explained in the following.

with the thermostatted chamber 12 an end-cooking chamber 23 is then associated, which is put into communication with the pre-cooking chamber 12 through said ball valve 15 and with the air space 17, through said valve 18 controlled by said pressure switch 19; the bottom 24 of said chamber 23 is in the form of a bottom plate, which is so mounted as to be capable of tilting, by effect of an arm 25 hinged in 25a; said bottom plate 24 is kept normally closed through a spring which applies an adequate force.

Furthermore, the bottom plate 24 is equipped with an upper perforated plate 26 integral with it and made with such a size as to enable the residual cooking water to be discharged at cycle end; the same bottom plate 24 is provided with a hole, and a flexible duct 27 puts said hole into communication with the pump 28; inside the container 23, and preferably in the lower portion thereof, a temperature control means 28a is installed; said temperature control means, set at a temperature comprised within the range of from 80 to 95° C., both acts on the value 29 which, through the duct 30, can withdraw cold water downstream the filter 4, and on a valve 31 which makes it possible hot water to be supplied to the container 23 withdrawing it from the kettle 1 through a duct 23a.

In the bottom portion of the container 23 a metal body 31a, of preferably conical shape, is positioned, which is provided with at least one calibrated bore 32b. Said metal body can freely slide along the cylindrical walls of said container; above the body 31a a suitably calibrated spiral spring 32 hangs over. Said cone-shaped body performs the function of regulating the escape of steam and also the very important function of preventing heat from being dispersed too rapidly from the bottom zone of the container 23, with temperature in said zone consequently undergoing undesired sharp decreases.

According to another form of practical embodiment, said controlled-expansion metal body to gradually reduce pressure can also be advantageously constituted by a metal disk having a diameter equal to the inner diameter of the container 23 and which, when is under resting conditions, realizes a substantially tight seal against the cylindrical wall of the container, and is subdivided into two equal half-circles hinged on a pivot along the diameter of the circle, so as to be able to rotate upwards around the pivot and to be lifted under the thrust generated by the pressure of steam contained inside the bottom portion of the container, counteracting the same pressure with their weight and/or with suitable return means, so as to enable amounts of steam, and of heat, to be released to the external environment in a controlled and calibrated way.

At the top of the end-cooking chamber 23, a container 33 is associated, which has a volume which is equal to 60% of volume of chamber 23. Said container 33 is put into communication with the latter by means of a pipe 34. The container 33 is connected with the chamber 23 also by a "T"-shaped pipe 35 whose diameter is half of diameter of pipe 34; said "T"-shaped pipe is connected with a discharge 36 of heat exchanger 6 through a pipe 35a preferably having the same diameter.

Downstream said container 33 there is furthermore positioned another container 37, whose volume is preferably equal to 50% of volume of container 33, connected with the latter by a pipe 38 which preferably has the same diameter as pipe 34; said container 37 is then connected with said pump 28 through a pipe 39 and with the inlet to the heat exchanger 6 through a pipe 40 whose diameter is preferably equal to the diameter of pipe 35.

The apparatus is then completed by an electronic, microprocessor-based device or the like, so programmed as to automatically accomplish, according to a preset sequence, the cooking cycle; for that purpose, all of the above listed valves are constituted by solenoid valves, and the pumps are constituted by motor-driven pumps.

In order to feed metered portions or amounts of raw "pasta" to the pre-cooking chamber 12, a mobile-wall metering device is provided, accomplished according to the present finding, of the type as depicted in figures 2–2a and 3–3a.

Said metering device is positioned above the charging funnel 20 and is constituted by a stationary inclined plate 41 (FIGS. 2 and 3), opposite to a second plate 42, also stationary and either vertical or inclined in the reverse direction, so as to generate with said plane 41 a hopper, the lower, longitudinal opening 43 of which is alternatively closed and opened by two plates 44–44a, which are at an angle to each other and are integral with a drive plate 45 which is mounted freely pivotal around an axis 46, parallel to the longitudinal slot 43. The mobile plate 45 is retained in an inclined position by a pre-loaded spring anchored to the lower portion, chute-shaped 41a of the stationary inclined plane 41. Then, to the chute-plate 41a a plate 49 is hinged in 48 and, under the latter, a tray-container 50 is positioned, hinged at an end around an axis 51 perpendicular to the axis of rotation 46 or the mobile plate 45. The container 50 is driven by a motor means of its own enslaved to said microprocessor.

Between the plates 41 and 42 raw "pasta" is deposited and in such case the inclined plate 44 keeps closed the opening or slot 43; when the container 50 is rotated upwards (FIG. 3), said rotation causes the plate 49 to be lifted relatively to the chute 41a, the spring 47 is released and therefore the mobile plate 45 is approached to the plate 42, thus opening the discharge slot 43.

The room between the two closure plates 44 and 44a (FIG. 2a) is such as to house a dose of "pasta" and when said dose has stopped between the plates 41a and 49 (FIG. 3), the tray 50 turns into horizontal by being urged to return by the spring 47; this movement brings the plate 44 to its position of closure of the slot, stopping the falling down of "pasta" and then enabling another dose thereof to be expelled, i.e., when the container will be lifted again in order to discharge the dose of "pasta" into the pre-cooking chamber.

The fast cooking cycle accomplished by the above disclosed apparatus can be summarized as follows:

The kettle 1 is brought into its steady-state operating conditions by energizing the resistor 8 (which is provided with such a value as to absorb a maximum power of 4.5 kW), until water reaches a temperature comprised within the range of from 160° to 175° C., at a pressure comprised within the range of from 7.5 to 8.5 bar, then the metering device is loaded with filamentary "pasta".

Any possible excess of pressure is vented by the valve 13 into the chamber 23. A blank cycle is then carried out to heat the whole system; the temperature-control means 28a requests water through valves 31 and/or 29 in order to keep the temperature controlled at a value of preferably 80°–95° C.

When the preliminary operations are over, the container 50 of the feeding system moves to the vertical position and applying a pressure to plate 45 and opening the spring 47 enables "pasta" to fill the room bounded by plates 41a and 49; then the container 50 moves back to its initial position, while the portion of "pasta" bounded by plates 49a and 49 falls into the container 50 and is ready to be poured into chamber 12.

At this point the pre-cooking cycle starts; the microprocessor checks whether temperature and pressure inside the kettle have the preset values for them, of, e.g., 175° C. and 8.5 bar, respectively. In the affirmative, the microprocessor opens the valve 14 and the loader 50 gets tilted. causing "pasta" to fall down into chamber 12; during such a function, a small amount of water is fed into the funnel 20 and then the valve 14, through the valve 21 and the spout 22; the basic task of said water is of preventing "pasta" (in particular, the small pieces of filamentary "pasta") from possibly sticking to the valve, thus preventing a large number of cycles from being correctly performed; to the loading device 50 getting titled the formation corresponds of another portion of "pasta" ready for the following cycle; when the charge is completed, the valve 14 is closed and cooking water is fed, preferably from the bottom upwards, into the chamber 12 through the valve 13; only after that said water has been fed to the chamber 12 a further amount of water is recalled through the pump 5 to replace inside the kettle the amount of water transferred into the pre-cooking chamber; during the several steps of the cycle, the microprocessor controls the temperature of water inside the air space 17.

When "pasta" has been softened (after approximately 15 seconds) and then has come to lay on the bottom of the chamber 12, a further amount of water is fed through the valve 13; this second feed stirs "pasta", favouring a uniform cooking (this operation can be repeated more times). After approximately 30 seconds, the valve 15 is opened and "pasta", is pushed, mixed with cooking water, into the chamber 23, owing to the difference in pressure; inside said chamber 23, the cooking of "pasta" ends within a time of from 15 to 30 seconds, according to whether a more of less complete type of cooking is selected, absorbing necessary water; the steam generated during the opening goes into the container 33 through the connection 34 and then into the container 37 through the connection 38, finally reaching the inlet end of the heat exchanger 6; such a system decreases pressure and temperature of concerned fluids, thus enabling the efficiency of the cycle to be increased. A portion of said steam returns back into the chamber 23 through the duct 35; a small amount of condensate is disposed off through the pipe 35a and is sent to the outlet end 36 of the heat exchanger 6; when "pasta" is transferred from chamber 12 to chamber 23, the steam generated lifts the cone 31a, causing it to apply a pressure against spring 32; the latter lowers again the cone 31a, whilst steam outflows through the bore 32b of said cone, thus keeping temperature more uniform.

During the end cooking step, salt dissolved in water and possibly oil drops are added to prevent "pasta" from forming clumps.

When cooking is ended, "pasta" is separated from water through the pump 28 which causes water to be discharged through the perforated wall 26; water is sent to the body 37 and then to the heat exchanger 6, thus realizing a high degree of heat recovery; starting from the first cycle ahead, in fact, the temperature of heat exchanger increases and kettle 1 is thus red with preheated water.

Finally, the bottom plate 24 is tilted and the dose of cooked "pasta" is deposited inside a container 24a. When "pasta" is expelled from pre-cooking chamber 12, the latter is ready to receive a new load of "pasta" in order to optimize the operating times of the machine when said machine operates under continuous operating conditions. Inasmuch as when the machine operates continuously, the temperature of container 23 tends of course to increase, this drawback is obviated by controlling said temperature by means of the temperature control unit 28a; in such a way, cooking degrees ape obtained, which ape absolutely constant and repeatable even for a large number of portions. Furthermore, at regular time intervals, e.g., every six minutes, the machine performs an idle cycle (i.e., without "pasta") to perform a complete washing of the system.

When the machine operates batchwise, at regular time intervals, preferably shorter than as in previous case (e.g., every two minutes), the machine performs a cycle with a small water amount, e.g., 50 g, to keep the system at the desired temperature. As said, the reverse cone 31a also performs the task of preventing a too fast heat dispersion, with a consequent undesired drop in temperature of the lower portion of container 23.

Possible overpressures inside the air space 17 are eliminated through the valve 18 controlled by the pressure switch 19 which in such case sends water to the end cooking chamber 23 in order to maintain it at the correct temperature value.

From the above, the matter of fact clearly appears that the particular structure of the apparatus, and, in particular, the temperature control of the pre-cooking chamber and the presence of the pressure containers 23, 33 and 37, make it possible, as a whole, an amount of power to be consumed which is not higher than 4.5 kW to heat the water contained inside the kettle, simultaneously making it possible a very fast complete cooking cycle at maximum of one minute pep each portion to be carried out.

Obviously, when the present invention, as disclosed and illustrated as above, is practically carried out, structurally and functionally equivalent modifications and variants can be supplied to it without departing from the scope of protection of the same finding.

I claim:

1. Apparatus for fast cooking, under pressure, alimentary pastas, such as noodles and similar filamentary pastas comprising a pre-cooking chamber and a separate end cooking chamber,
- a closable receptacle, heating means for said receptacle, means for supplying water to said receptacle so that the water in said receptacle will be heated to an elevated temperature and an elevated pressure,
- said pre-cooking chamber having a vertical axis and temperature stabilizing means, conduit means for supplying heated water from said receptacle to said temperature stabilizing means of said pre-cooking chamber, said pre-cooking chamber having an upper end, a metering hopper for supplying a selectable quantity of raw pasta to said upper end, said pre-cooking chamber having a bottom,
- duct means for supplying heated water from said receptacle to said upper end and said bottom of said pre-cooking chamber,
- said end cooking chamber having a bottom portion, feed means connecting said bottom of said pre-cooking chamber to said bottom portion of said end cooking chamber, said feed means including a closing member, said end cooking chamber having temperature control means including flow means for selectively supplying water from said receptacle and from an external water source to the interior of said end cooking chamber,
- said apparatus further including pressure regulating means associated with said end cooking chamber to control release of any steam pressure from said end cooking chamber and generated in said end cooking chamber, said pressure regulating means including a plurality of expansion chambers connected in series downstream of said end cooking chamber to gradually reduce the pressure of any steam generated in said end cooking chamber and to recover water for return to said receptacle, and
- a micro-processor to control the operation of said apparatus.

2. The apparatus as claimed in claim 1 wherein said temperature stabilizing means comprises a jacket surrounding at least a portion of said pre-cooking chamber.

3. The apparatus as claimed in claim 1 wherein said duct means comprises a first pipe supplying water from said receptacle to said metering hopper and a second pipe connected adjacent to said bottom of said pre-cooking chamber, said pipes each having a control valve.

4. The apparatus as claimed in claim 1 wherein said pressure regulating means further includes an inverted cup member mounted for movement in said end cooking chamber against resilient means, said cup having an apex provided with a calibrated aperture, said end cooking chamber having an interior wall and said cup slidably engaging said interior wall.

5. The apparatus as claimed in claim 1 wherein said end cooking chamber has an interior substantially cylindrical wall and said pressure regulating means further includes a controlled expansion member comprising disk means located in said end cooking chamber and dividing said end cooking chamber into upper and lower portions, said disk means including means allowing escape of gas from said lower to said upper portion in response to an increase in pressure in said lower portion.

6. The apparatus as claimed in claim 5 wherein said disk means in conically shaped and has an apex provided with a calibrated opening, said disk means having a periphery in sealing engagement with said interior wall of said end cooking chamber.

7. The apparatus as claimed in claim 6 wherein said disk means is slidable along said interior wall in response to a predetermined pressure increase in said lower portion.

8. The apparatus as claimed in claim 5 wherein said disk means comprises a disk having a perpheral edge and diameter equal to the diameter of said end cooking chamber so that said peripheral edge will sealingly engage said interior wall, said disk comprising two, equal half disks hinged along a diameter to allow rotation of said half disks upwardly about said diameter in response to a pressure increase in said lower portion to allow the escape of fluid.

9. The apparatus as claimed in claim 1 wherein said plurality of expansion chambers includes two expansion chambers each having an upper portion connected serially through conduits to said end cooking chamber, a first one of said expansion chambers having a volume equal to about 60% of the volume of said end cooking chamber and a second one of said expansion chambers, connected downstream of said first one, having a volume equal to about 50% of the volume of said first one of said expansion chambers.

10. The apparatus as claimed in claim 9 wherein a first one of said conduits connecting said end cooking chamber to said first one of said expansion chambers has a selected diameter and said end cooking chamber is connected to said first of said expansion chambers with another conduit having a diameter that is one half the said diameter of said first one of said conduits.

11. The invention as claimed in claim 10 wherein a further conduit connects said two expansion chambers and has a diameter substantially equal to the said diameter of the conduit connecting the upper portions of said end cooking chamber and said first expansion chamber.

12. The apparatus as claimed in claim 1 wherein said metering hopper comprises a first and a second plate, said second plate being mounted for pivoting movement relative to said first plate to move said second plate between a pasta receiving position and a pasta discharging position.

13. The apparatus as claimed in claim 12 wherein said metering hopper further comprises a dosing means controlling the flow of pasta from a supply to said first and second plates when said second plate is in said pasta receiving position.

14. The apparatus as claimed in claim 13 wherein said dosing means includes a third plate pivotally mounted adjacent a portion of said first plate for movement between a pasta receiving position and a pasta discharging position, receptacle means for receiving pasta from said first and second plates, said receptacle means being mounted for pivoting movement between a discharging position and a receiving position, said receptacle means engaging said second plate and said third plate when moved to said pasta discharging position.

15. The apparatus as claimed in claim 14 wherein spring means are provided to urge said third plate toward said pasta receiving position.

* * * * *